United States Patent [19]

Kaplan et al.

[11] E Re. 30,626

[45] Reissued May 26, 1981

[54] SPHERES OBTAINED BY VAPOR DEPOSITION FOR USE IN BALL POINT PENS

[75] Inventors: Richard B. Kaplan, Santa Monica; Sebastian Gonnella, Arleta, both of Calif.

[73] Assignee: Ultramet of Pacoima, Pacoima, Calif.

[21] Appl. No.: 75,611

[22] Filed: Sep. 14, 1979

Related U.S. Patent Documents

Reissue of:

[64] Patent No.: 4,150,905
Issued: Apr. 24, 1979
Appl. No.: 766,880
Filed: Feb. 9, 1977

[51] Int. Cl.[3] ..... B43K 7/10; C23C 11/00; C23C 13/00

[52] U.S. Cl. ..... 401/215; 29/148.4 B; 428/403; 427/249

[58] Field of Search ..... 401/215; 29/148.4 B, 29/148.4 R; 428/403; 427/248 R, 248.3, 249, 250

[56] References Cited

U.S. PATENT DOCUMENTS 3,503,692 3/1970 Kubota et al. ..... 401/215 X

FOREIGN PATENT DOCUMENTS 829414 1/1952 Fed. Rep. of Germany ..... 401/215
1060802 4/1954 France ..... 401/215
83271 6/1964 France ..... 401/215

*Primary Examiner*—Stephen C. Pellegrino
*Attorney, Agent, or Firm*—Edwin A. Oser

[57] ABSTRACT

A sphere particularly suitable for ball point pens having a core capable of withstanding temperature in excess of 800° C. and a chemically vapor deposited coating on the core, the combined diameter of core and coating ranging from approximately 0.5 to approximately 1 mm in diameter. For example, the core may consist of a metal such as tungsten, nickel, copper or molybdenum; or alternatively the core may consist of a ceramic such as aluminum oxide or graphite. The vapor deposited coating may consist of a metal carbide such as tungsten carbide, titanium carbide, tantalum carbide or niobium carbide. Alternatively the coating may consist of a metal boride such as titanium diboride.

19 Claims, 3 Drawing Figures

SPHERES OBTAINED BY VAPOR DEPOSITION FOR USE IN BALL POINT PENS

Matter enclosed in heavy brackets [ ] appears in the original patent but forms no part of this reissue specification; matter printed in italics indicates the additions made by reissue.

BACKGROUND OF THE INVENTION

For the more expensive ball point pens now in use the highest quality balls or spheres consist of tungsten carbide. Such tungsten carbide balls are presently fabricated by means of powder metallurgy. In this technique a suitable powder consisting, for example, of tungsten carbide and cobalt is cold pressed and then heated until the powder sinters or fuses together. In this manner a small ball may be manufactured with a cobalt binder. The resulting ball is still somewhat porous. Hence due to the porosity of the ball and the presence of cobalt in the interstices of the tungsten carbide grains making up the ball the ball can be chemically attacked by the various inks used in ball point pens.

In addition, balls produced by powder metallurgy, as explained hereinabove, are not sufficiently spherical. As a result they require a considerable amount of rough grinding so that they become sufficiently spherical for the finish grinding steps.

It is accordingly an object of the present invention to provide a ball suitable for ball point pens which is not porous and has no binder material, hence is substantially immune to chemical attack by the inks used in ball point pens.

Another object of the present invention is to provide a ball of the type discussed consisting of a core with a coating obtained by chemical vapor deposition and which can be manufactured relatively inexpensively.

SUMMARY OF THE INVENTION

In accordance with the present invention there is provided a ball which is particularly suitable for a ball point pen. The ball comprises a core which consists of a refractory material capable of withstanding a temperature in excess of 800° C. (centigrade). The material of the core should also be compatible with the coating. The coating on the core is deposited by chemical vapor deposition so that core and coating have a combined diameter between approximately 0.5 and approximately 1 mm in diameter. The finished product is substantially spherical.

In a preferred embodiment the core consists of tungsten and the vapor deposited coating of tungsten carbide.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENTS

Figure 1:
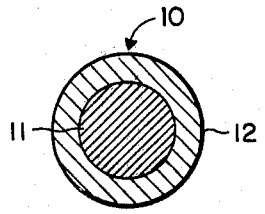
FIG. 1 is a cross-section on enlarged scale of a ball or sphere in accordance with the present invention.

Referring now to FIG. 1 there is shown on enlarged scale a substantially spherical ball 10 which is suitable for ball point pens and the like. The ball consists of a core 11 and a coating 12 which has been deposed thereon by chemical vapor deposition.

In order to explain the principles of the present invention a preferred embodiment of the present invention will first be explained, as well as the method of manufacture thereof. Thus by way of example, the core 11 may consist of tungsten obtained, for example, in the form of a powder of approximately 325 mesh. The starting size of such a core of tungsten seed 11 may be between approximately 10 and approximately 100 microns (1 micron $=10^{-6}$ meter).

Figure 2:
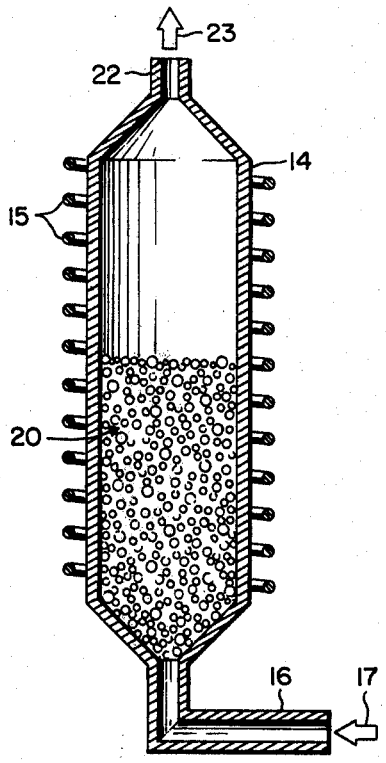
FIG. 2 is a schematic sectional view of an induction heated fluid bed reactor for the chemical vapor deposition of a coating on the core.

Such a ball may, for example, be manufactured in the graphite tube 14 shown in FIG. 2. The graphite tube 14 may be heated inductively by an induction coil 15 as shown. A fluidizing gas is introduced into the bottom portion of the graphite tube 14 through an input tube 16 as shown by the arrow 17. This gas may consist of a mixture of hydrogen and an inert gas such as argon, helium or nitrogen. The interior of the graphite tube 14 is partially filled with the tungsten cores or seeds shown at 20. The tube is now heated to a temperature between approximately 500° C. and 950° C.

Now tungsten hexafluoride ($WF_6$) is mixed with a suitable carborizing gas such as methane ($CH_4$), butane ($C_4H_{10}$), acetylene ($C_2H_2$) or the like. This mixture of tungsten hexafluoride and a carbonizing gas is injected through the input tube 16 into the graphite tube 14, where the gas passes through the suspended seeds 20.

As a result tungsten carbide is chemically vapor deposed on each seed or core of tungsten. A simplified form of the chemical reaction is as follows:

$$H_2+WF_6+CH_4 \rightarrow WC+6HF \qquad (1)$$

It will be evident that the thickness of the coating depends both on the time the reaction takes place, as well as on the reaction temperature. Thus the particles or cores are allowed to grow until they have reached a predetermined diameter. For example, if the tungsten hexafluoride and carbonizing gas are reacted at 950° C. for six hours the diameter of a sphere may increase from 100 microns to 1 millimeter.

Experiments have shown the balls produced as explained herein have a much higher initial sphericity than balls obtained by a powder metallurgy technique. They, of course do not contain any cobalt and have virtually no porosity. Hence they are basically not subject to chemical attack by the inks used in ball point pens.

The induction heating furnace of FIG. 2 is provided with an exit tube 22 which may be connected to a vacuum pump as shown by the arrow 23.

Figure 3:
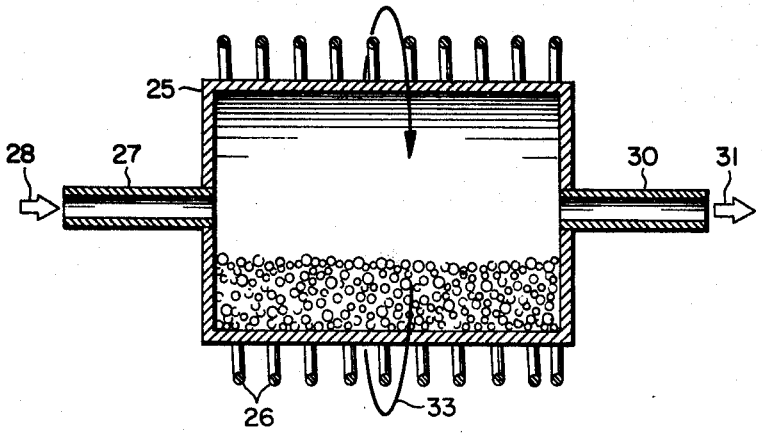
FIG. 3 is a schematic sectional view of a tumbling reactor which may be used instead for providing the coating on a suitable core.

Alternatively the reaction tumbler of FIG. 3 may be used for the same process. The tumbler consists again of a graphite cylinder 25 surrounded by induction coils 26 for heating the tumbler. The gases are introduced through the inlet tube 27 as shown by arrow 28, while the exit tube 30 connects to a vacuum pump as shown by the arrow 31. The chemical process is otherwise the same except that the cylinder 25 is rotated as indicated by the arrow 33.

This makes it possible to increase the size of the balls after they have reached an initial diameter of say approximately 0.5 millimeter. The tumbling reactor of FIG. 3 has the advantage that it allows plating of a larger number of balls for each batch.

In accordance with the present invention it is not necessary that the core 11 consist of tungsten. Instead it may consist of nickel, copper or molybdenum. Alternatively, the core may consist of a ceramic such as aluminum oxide ($AL_2O_3$) or graphite. The main requirement for the core is that it is capable of withstanding the chemical vapor deposition temperatures which can exceed 900° C. In addition, the core should be compatible with the coating to be deposited.

The coating may consist of a suitable carbide besides tungsten carbide. Among these carbides are niobium carbide, titanium carbide or tantalum carbide. Alternatively, a metal boride may be used such as titanium diboride.

In order to manufacture titanium carbide a temperature of between approximately 800° and approximately 1300° C. may be used. The chemical reaction may proceed as follows:

$$TiCl_4+CH_4 \rightarrow TiC+4HCl \quad (2)$$

It will be noted that the starting material is titanium tetrachloride.

For tantalum carbide the reaction temperature is between approximately 900° C. and 1400° C. and the reaction is as follows:

$$TaCl_5+5/2H_2+C \rightarrow TaC+5HCl \quad (3)$$

In this case again the starting material is tantalum pentachloride.

Similarly for niobium carbide the reaction temperature is between 900° and approximately 1400° C. The chemical reaction is as follows:

$$NbCl_5+5/2H_2+C \rightarrow NbC+5HCl \quad (4)$$

The starting material is niobium pentachloride. The carbon (C) in formulas (2) to (5) may again be obtained from a carbonizing gas as mentioned before.

By way of example, it is also possible to start with a core consisting of a nickel sphere of 0.7 mm diameter. The coating may again consist of tungsten carbide and may have a thickness so that the diameter of the finished sphere is somewhat greater than 1 mm corresponding to a pen ball having a diameter of one millimeter.

The thickness of the coating should be in any case no less than 50 microns. It may be necessary to lap or grind the finished ball to insure that it is perfectly spherical. In this case the coating may have to be somewhat thicker to make up for the loss of thickness due to the lapping or grinding.

There has thus been disclosed a method of manufacturing spheres suitable for ball point pens and the resulting product. The spheres of the present invention are characterized by a core covered with a coating obtained by chemical vapor deposition. They are substantially without pores and do not contain cobalt and hence the finished product substantially is not subject to corrosion or other chemical attack by the various inks used in ball point pens.

What is claimed is:

1. A ball particularly suitable for a ball point pen and comprising:

(a) a core consisting of a refractory material capable of withstanding a temperature in excess of [800°] *500°* C.; and (b) a coating on said core, said coating being deposited from the vapor phase by hydrogen reduction of a refractory metal halide, said core and coating having a combined diameter of from approximately 0.5 mm to approximately 1 mm and being substantially spherical.

2. A ball as defined in claim 1 wherein said coating consists of a metal carbide.

3. A ball as defined in claim 2 wherein said coating consists of tungsten carbide.

4. A ball as defined in claim 2 wherein said coating consists of tantalum carbide.

5. A ball as defined in claim 2 wherein said coating consists of titanium carbide.

6. A ball as defined in claim 2 wherein said coating consists of niobium carbide.

7. A ball as defined in claim 1 wherein said coating consists of a metal boride.

8. A ball as defined in claim 7 wherein said coating consists of titanium diboride.

9. A ball as defined in claim 1 wherein said core consists of a ceramic.

10. A ball as defined in claim 9 wherein said core consists of aluminum oxide.

11. A ball as defined in claim 1 wherein said core consists of a metal.

12. A ball as defined in claim 11 wherein said core consists of tungsten.

13. A ball as defined in claim 11 wherein said core consists of molybdenum.

14. A ball as defined in claim 11 wherein said core consists of copper.

15. A ball as defined in claim 11 wherein said core consists of nickel.

16. A ball as defined in claim 1 wherein said coating has a thickness no less than 50 microns.

17. A [sphere] *ball* particularly suitable for a ball point pen comprising:

(a) a core consisting of tungsten; and (b) an outer coating consisting of tungsten carbide, said coating being deposited from the vapor phase by the hydrogen reduction of tungsten halide in the presence of a carborizing gas, said ball being substantially spherical and having a diameter between about 0.5 and about 1 mm.

18. A ball as defined in claim 17 wherein said coating has a thickness no less than 50 microns.

19. A ball particularly suitable for a ball point pen and comprising:

(a) a core consisting of a refractory material capable of withstanding a temperature in excess of [800°] *500°* C.; and (b) a coating on said core, said coating consisting of a substantially pure refractory metal deposited from the vapor phase by hydrogen reduction of a refractory metal halide, said ball having a diameter between approximately 0.5 and approximately 1 mm and being substantially spherical.

* * * * *